United States Patent

[11] 3,586,789

[72] Inventors Dennis Norman Butcher
Surrey;
James Edward Wicks, Middlesex, both of, England

[21] Appl. No. 784,604
[22] Filed Dec. 18, 1968
[45] Patented June 22, 1971
[73] Assignee International Computers Limited
London, England
[32] Priority Dec. 23, 1967
[33] Great Britain
[31] 58576/67

[54] TWO-SPEED TAPE TRANSPORT CONTROL USING TWO CONTROL SIGNALS

4 Claims, 2 Drawing Figs.

[52] U.S. Cl. ........ 179/100.2
[51] Int. Cl. ........ G11b 15/44, G11b 15/02
[50] Field of Search ........ 179/100.2 S, 100.1 VC; 274/4 D, 11 D; 226/30, 40, 42

[56] References Cited

UNITED STATES PATENTS

| | | | |
|---|---|---|---|
| 2,585,724 | 2/1952 | Barany et al. | 274/4 |
| 3,084,226 | 4/1963 | Moulic | 179/100.2 |
| 3,166,328 | 1/1965 | Roberts | 179/100.2 |
| 3,222,074 | 12/1965 | Walker | 274/4 |
| 3,281,041 | 10/1966 | Baringer et al. | 226/40 |
| 3,449,528 | 6/1969 | Camras | 226/42 |

FOREIGN PATENTS

| | | | |
|---|---|---|---|
| 1,187,821 | 2/1965 | Germany | 274/4 |

*Primary Examiner*—Bernard Konick
*Assistant Examiner*—Robert S. Tupper
*Attorney*—Hane & Baxley

ABSTRACT: Apparatus for feeding a loop of magnetic tape is described in which signals recorded in a control track coextensively with information signals recorded in an information track are utilized to control the tape feed so that during recording or playback of a block of information signals, the tape is fed at slow speed and between blocks of information signals the tape is fed at fast speed. The tape feed may be automatically stopped at the beginning of each block of information.

INVENTORS
DENNIS NORMAN BUTCHER
JAMES EDWARD WICKS
BY Hane and Baxley
ATTORNEYS

INVENTORS
DENNIS NORMAN BUTCHER
JAMES EDWARD WICKS
BY Hane and Baxley
ATTORNEYS

TWO-SPEED TAPE TRANSPORT CONTROL USING TWO CONTROL SIGNALS

BACKGROUND OF THE INVENTION

The present invention relates to magnetic tape recording and reproducing apparatus for use with a closed loop of dual-track magnetic tape.

SUMMARY OF THE INVENTION

Apparatus for feeding a closed loop of magnetic tape which carries at least one block of recording, each block consisting of coextensive recordings in information and control tracks, the apparatus includes means operable to feed the tape selectively at a slow speed and at a fast speed, first reading means for the information track, and control means responsive to signals from the second reading means to apply control signals to the feeding means to cause it to switch from slow speed to fast speed immediately after the end of a block of recording in the information track passes the first reading means and to switch from fast speed to slow speed immediately before the beginning of the block of recording, or the next block of recording, in the information track reaches the first reading means.

DESCRIPTION OF THE PREFERRED EMBODIMENT

Figure 1:
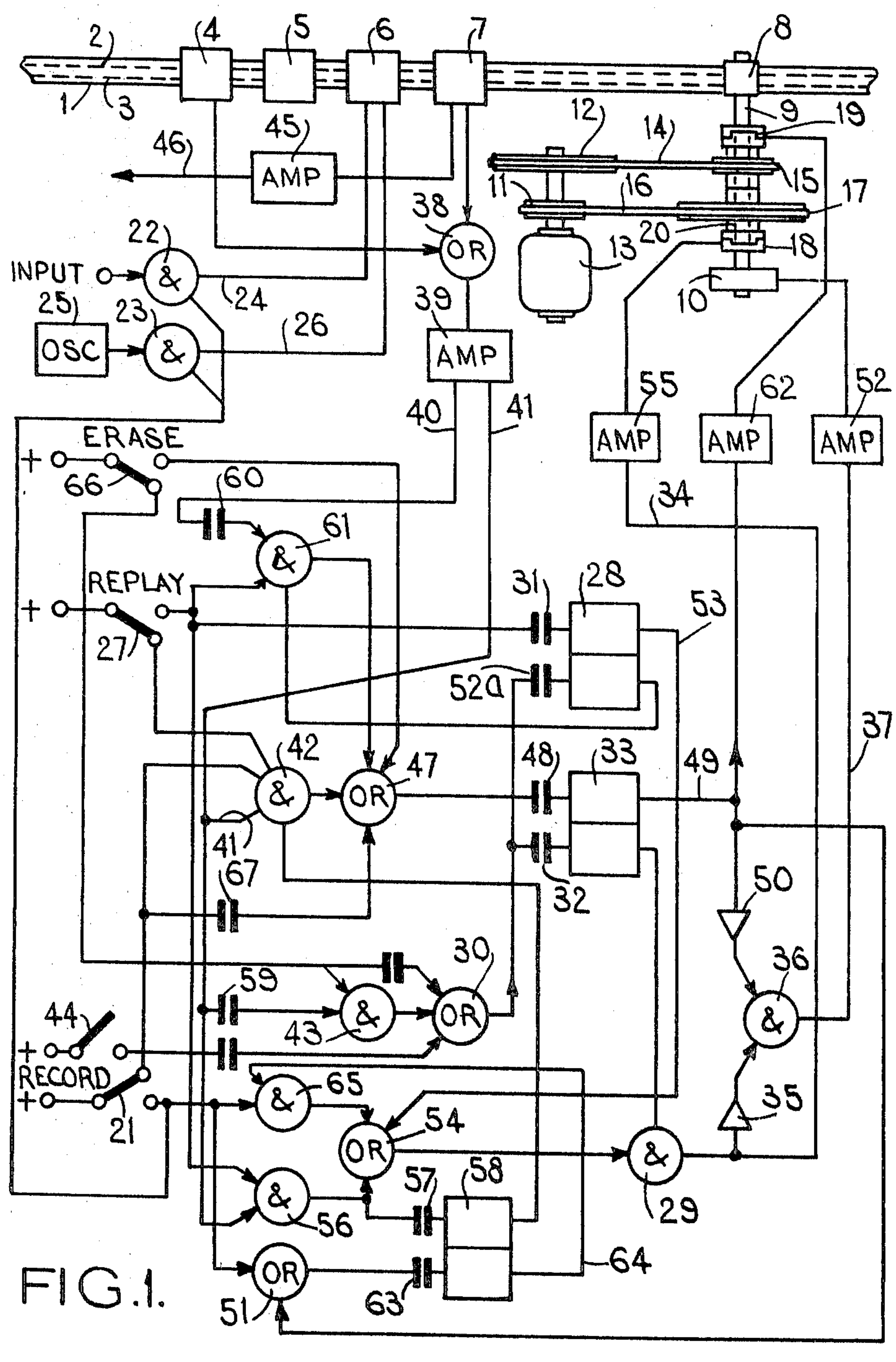
FIG. 1 shows a schematic illustration of a tape feed.

FIG. 1 shows a magnetic recording tape 1 which carries an information track 2 and a control track 3. The tape can be fed past four dual-track magnetic head assemblies 4, 5, 6 and 7 in a direction from left to right, by rotation of a capstan roller 8. The portion of tape shown in the drawing is a part of a closed loop, the other part of the loop, for example, being stored temporarily, in loosely folded form, in a tape cassette (not shown).

Instead of dual-track magnetic head assemblies, the various magnetic heads may be distinct and separate units. For example, the right-hand magnetic head associated with the control track 3 may be displaced to the right of the corresponding head associated with the information track 2.

The capstan roller 8 is mounted on one end of a shaft 9, which carries an electromagnetic brake 10 on the other end. Pulleys 11 and 12 are secured to the shaft of an electric motor 13. The pulley 11 is coupled to a pulley 17 by a belt 16. The pulley 17 is secured to a sleeve 20, which is loose on the shaft 9. The sleeve 20 is coupled to the shaft 9 by an electromagnetic clutch 18, so long as the clutch is energized. The pulley 12 may be used to drive the shaft 9 through belt 14, pulley 15 and electromagnetic clutch 19. It has been found that toothed rubber belts, with corresponding pulleys, provide a very satisfactory drive to the tape.

The speed of the motor 13, in conjunction with the relative sizes of the pulleys 11 and 17, is such that the tape is driven at a slow speed, for example, 1 to 2 inches per second, when the clutch 18 is engaged. This speed is used when information is to be recorded on, or played back from, the track 2. When the clutch 19 is energized, instead of the clutch 18, the tape is driven at a fast speed, for example, 30 to 60 inches per second. The fast speed is used when the tape on which no information is recorded is being fed past the magnetic heads, or when previously recorded information is being erased from the tape.

The functions performed by the various magnetic heads can be set out conveniently in tabular form:

| | Head assembly | | | |
|---|---|---|---|---|
| | 4 | 5 | 6 | 7 |
| Track 2 | Pre-bias | Erase | Record | Read. |
| Track 3 | Read | do | do | Do. |

Recorded information is erased from the information track 2 by applying a direct current to head 5(2), that is, the head in assembly 5 which is aligned with track 2, which current is sufficient to produce magnetic saturation of the tape. When information is to be recorded in track 2, a direct current is applied to head 4(2) to produce a field which returns the tape from saturation to an approximately demagnetized state. The tape then passes the recording head 6(2), to which are applied the information signals which are to be recorded. The information signals may be voice, or other audio signals, or they may be, say, pulse signals which represent information in binary coded form.

Initially the closure of standby switch 44 resets flip-flops 28 and 33 so that lines 53 and 49 are low. Line 37 is high and hence the tape is stationary through energization of brake 10 by amplifier 52. When it is desired to record information, a record switch 21 is shifted to apply enabling voltages to AND gates 22 and 23. The gate 22 allows input information signals to pass to the head 6(2) over line 24. The gate 23 allows signals from an audio oscillator 25 to pass to the head 6(3) over line 26. Thus, the recording of an audio tone on the track 3 is coextensive with the recording of information on the track 2.

It will be assumed that a single block of information is recorded on the tape and that it is desired to replay this repeatedly. Closing the standby switch 44 prepares the control circuit for operation by producing a pulse which passes through OR gate 30 and capacitor 32 to reset drive control flip-flop 33. The same pulse passes via capacitor 52*a* to reset flip-flop 28. Flip-flop 33 applies an enabling voltage to AND gate 29 which is held closed by its other input at this time. Lines 34 and 49 are both low, so that AND gate 36 is held open by inverters 35 and 50. Hence, line 37 is high, causing the brake 10 to be energized by amplifier 52.

Replay switch 27 is now shifted. This causes a pulse to be applied through capacitor 31 to set flip-flop 28. Line 53 goes high and applies a second input to AND gate 29 through OR gate 54. AND gate 29 opens so that line 34 is high and the slow-speed clutch 18 is energized by amplifier 55. At the same time, AND, gate 36 is closed, by the output from inverter 35 becoming low, to deenergize the brake 10. Hence the capstan 8 is rotated to move the tape past the head assemblies at slow speed.

Assuming that the beginning of the recording was located between the head assemblies 4 and 7, the head 4(3) will pick up tone from the control track as soon as the tape is moving. The signals from the head 4(3) are fed through OR gate 38 to an amplifier 39. This amplifier provides complementary outputs on lines 40 and 41. Line 41 is high when the amplifier is receiving an input. AND gate 56 is connected to line 41 and to the replay switch 27 so that this gate opens and applies an input to AND gate 29 through OR gate 54. A pulse is also applied through capacitor 57 to set flip-flop 58. At the same time, a pulse is applied via capacitor 59, AND gate 43, OR gate 30 and capacitor 52*a* to reset flip-flop 28. AND gate 29 is then held open by the outputs from AND gate 56 and flip-flop 33. The recorded information is read by head 7(2), the signals being amplified by amplifier 45 and fed via line 46 to a loudspeaker, or other utilization device.

When the end of the block of information passes the head 4(3), the output from this head ceases. However, the head 7(3), is also connected to the OR gate 38, so that tone input to the amplifier 39 is maintained until the end of the block has passed the head assembly 7, allowing the whole of the block to be read by the head 7(2). The state of the lines 40 and 41 is reversed when tone input ceases to the amplifier 39. This causes closure of the AND gate 56. At the same time, the rise of line 40 produces a pulse via capacitor 60, AND gate 61, OR gate 47 and capacitor 48 to set flip-flop 33 which resets flip-flop 58 so that AND gate 42 is closed when line 41 is high. Line 49 goes high to energize the fast-speed clutch 19 through amplifier 62, and to hold AND gate 36 closed through inverter 50. Both inputs to AND gate 29 are low, so that the slow speed clutch 18 is deenergized.

The capstan 8 is now rotated to drive the tape at the fast speed. The tape continues to run at this speed until the beginning of the block of information reaches the head assembly 4, whereupon the head 4(3) once more produces a tone input to the amplifier 39. The state of the lines 40 and 41 is reversed again to open AND gate 56. A pulse is applied via capacitor 59, AND gate 43, OR gate 30 and capacitor 32 to reset flip-flop 33. Thus, line 49 goes low and AND gate 29 is opened. This causes deenergization of the clutch 19 and energization of the clutch 18. The information will read at slow speed, in the manner already explained, followed by a fast-speed feed. The cycle will be repeated so long as the replay switch 27 remains in the on position.

If the replay switch 27 is shifted to the off position whilst the tape is being driven at fast speed, the clutch 19 will remain engaged under control of the flip-flop 33. The flip-flop 33 will be reset in the manner already described when the beginning of the block of information reaches the head assembly 4. However, the AND gate 56 will be closed with the replay switch 27 in the off position. Hence, the AND gate 29 will also be closed, lines 34 and 49 will be low, the AND gate 36 will be opened and the brake 10 will be energized to halt the tape with the beginning of the block between the head assemblies 4 and 7.

If the replay switch is shifted to the off position whilst the tape is being driven at slow speed, AND gate 42 will provide an output through OR gate 47 and capacitor 48 to set the flip-flop 33. The tape will thereupon be driven at the fast speed until it is halted with the beginning of the block between the head assemblies 4 and 7, as described in the preceding paragraph.

When the record switch 21 is shifted, a pulse is applied through capacitor 63 to reset flip-flop 58. The high output on line 64 opens AND gate 65, in conjunction with the input from the switch 21. The output from AND gate 65 passes through OR gate 54 to AND gate 29. The flip-flop 33 is already in the reset state as a result of previous closure of the switch 44, or the termination of a replay operation or an erase operation, so that AND gate 29 is opened to energize the clutch 18. Shifting the record switch to the off position closes the AND gate 65, so that the clutch 18 is deenergized. A signal is also fed via capacitor 67, OR gate 47 and capacitor 48 to set flip-flop 33. This causes energization of clutch 19 so that the tape is fed at the fast speed to bring the beginning of the recording to the heads. The feed is terminated by a signal from AND gate 43 in a manner similar to that already described.

Setting erase switch 66 to the on position sets flip-flop 33 through OR gate 47 and capacitor 48, so that the clutch 19 is energized to drive the tape at the fast speed. The relatively large ratio between the fast and slow speeds would require a frequency approaching 1 MHz to provide satisfactory AC erasure. The use of DC erasure avoids the necessity for providing such an AC source and the relatively expensive erasing heads which would be required to provide an adequate performance at this frequency. Returning the switch 66 to the off position produces a pulse, via OR gate 30 and capacitor 32, to reset flip-flop 33 to stop the tape feed.

By slight modifications, the apparatus may be used to record several separate blocks of information on the tape. The simplest modification is a pushbutton switch which may be depressed to apply a disabling voltage to AND gate 23. The record switch is left in the on position after the first recording and the pushbutton is depressed for a sufficient length of time to provide the desired gap in the tone recording on the control track. This is convenient for a small gap between adjacent recordings since the tape is moving at the slow speed. An alternative modification, which is convenient for large gaps between successive recordings, is to provide a switch which applies a momentary input to OR gate 30. The record switch is set to off at the end of the first recording, which causes the tape to be driven at the fast speed. When the desired length of tape has been fed, the additional switch is depressed to apply a signal to OR gate 30, thereby resetting flip-flop 33 and stopping the tape feeding. The record switch 21 is then moved to the on position to begin recording the next block of information.

The operation when replaying a tape on which several blocks of information have been recorded is similar to that described in relation to a single block. The tape will run at slow speed whilst a block is passing the head assemblies and at the fast speed in between blocks.

Figure 2:
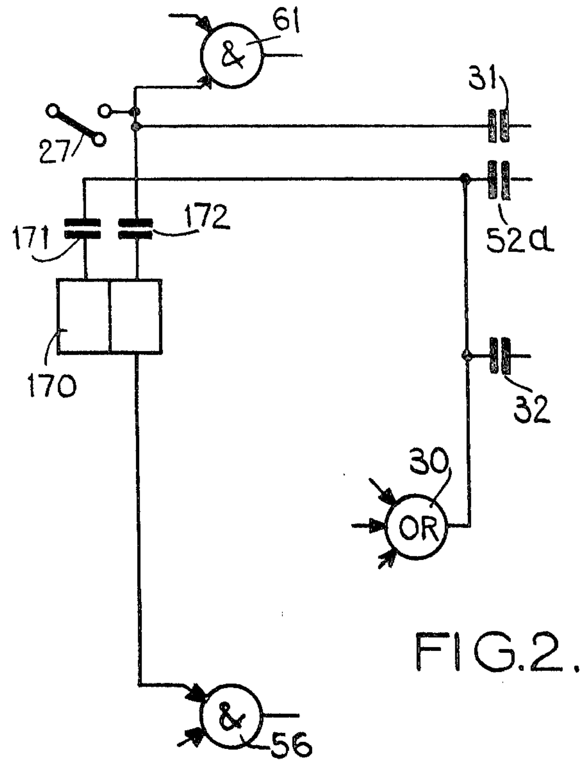
FIG. 2 is a schematic illustration of a modification of the tape feed illustrated in FIG. 1.

Referring now to FIG. 2 the control circuit is modified whereby only a single block of information is read each time the replay switch 27 is set on. The connection between the replay switch 27 and the AND gate 56 is broken and one input and one output of a flip-flop 170 interposed, together with the associated DC blocking capacitor 172. The other input is connected via the associated DC blocking capacitor 171 to the output from the OR gate 30.

In operation the flip-flop 170 is set by setting on the replay switch 27 and is reset by the output from the OR gate 30 on the commencement of tone signal from the next block of information. The time constant of the setting input is chosen such that flip-flop 170 remains set after replay switch 27 is closed despite any initial transient reset pulse from OR gate 30. Thus the tape is stopped with the commencement of the next block of information between head assemblies 4 and 7. The next block of information may be played by opening and reclosing the replay switch 27.

We claim:

1. Apparatus for moving a recording medium in which the medium carries more than one block of information, each said block including coextensive recordings in information and control tracks, including first and second drive means for selectively driving the recording medium at slow and fast speeds, respectively, means to produce first and second control signals in response to recording and the absence of recording in the control track, respectively, a control bistable device, means to apply said first control signal to said device to condition said device in a RESET state, means responsive to said first control signal and said device conditioned in a RESET state to energize said first drive means, means to apply said second control signal to said device to condition said device in a SET state and means responsive to said device conditioned in a SET state to energize said second drive means such that said recording medium is driven at a fast speed upon the occurrence of said second control signals.

2. An apparatus as claimed in claim 1 in which said means for producing first and second control signals includes an amplifier having first and second output lines and transducing means for producing electrical representations from recordings in said control track, said first and second control signals being produced on said first and second output lines, respectively.

3. An apparatus as claimed in claim 1 in which said means responsive to said first control signal and said device conditioned in a RESET state includes first and second AND gates and an OR gate, said first AND gate having a replay signal and said first output line as inputs thereto, the output of said first AND gate being applied through said OR gate as one input to said second AND gate, the other input of said second AND gate being responsive to said control bistable device in a RESET state with the output of said second AND gate being applied to said first drive means.

4. An apparatus as claimed in claim 3 in which said means to apply said second control signal to said device includes a third AND gate, one input of which is connected to said second output line of said amplifier and the other input of which is connected to receive said replay signal, The output of said third AND gate being applied to condition said control bistable device in a SET state.